US012140890B2

(12) United States Patent
Yamaguchi et al.

(10) Patent No.: US 12,140,890 B2
(45) Date of Patent: Nov. 12, 2024

(54) FIXING APPARATUS AND IMAGE FORMING APPARATUS

(71) Applicant: CANON KABUSHIKI KAISHA, Tokyo (JP)

(72) Inventors: Hiroki Yamaguchi, Kanagawa (JP); Terutaka Endo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/321,091

(22) Filed: May 22, 2023

(65) Prior Publication Data

US 2023/0324835 A1 Oct. 12, 2023

Related U.S. Application Data

(63) Continuation of application No. 17/462,383, filed on Aug. 31, 2021, now Pat. No. 11,693,342.

(30) Foreign Application Priority Data

Sep. 2, 2020 (JP) ................................ 2020-147503
Aug. 10, 2021 (JP) ................................ 2021-130931

(51) Int. Cl.
*G03G 15/20* (2006.01)
*G03G 21/16* (2006.01)

(52) U.S. Cl.
CPC ..... *G03G 15/2028* (2013.01); *G03G 21/1685* (2013.01)

(58) Field of Classification Search
CPC ........... G03G 21/1685; G03G 15/2028; G03G 15/6573; G03G 2215/00413; G03G 2215/00417
See application file for complete search history.

(56) References Cited

U.S. PATENT DOCUMENTS 6,754,458 B2 6/2004 Makihira
7,809,303 B2 * 10/2010 Igarashi ............... G03G 21/206 399/92

(Continued)

FOREIGN PATENT DOCUMENTS

JP 2003140480 A 5/2003
JP 2007086480 A 4/2007

(Continued)

OTHER PUBLICATIONS

Office Action issued in U.S. Appl. No. 17/462,383 mailed on Oct. 11, 2022.

(Continued)

*Primary Examiner* — Carla J Therrien
(74) *Attorney, Agent, or Firm* — ROSSI, KIMMS & McDOWELL LLP

(57) ABSTRACT

A first rotating member a heating recording medium, a second rotating member forming a nip portion with the first rotating member, a holding member disposed downstream of the nip portion in a conveying direction and holds a conveying member conveying the recording medium, and a guide member facing the conveying member, the fixing apparatus is not exposed to an outside when opening/closing member is in a closed state, the fixing apparatus is exposed to the outside when the opening/closing member is in an opened state. A distance between the holding member being in the closed state and at a first position and the guide member is a first distance. A distance between the holding member being in the opened state and at a second position and the guide member is a second distance, and the second distance is shorter than the first distance.

7 Claims, 10 Drawing Sheets

(56) References Cited

U.S. PATENT DOCUMENTS

| | | | | |
|---|---|---|---|---|
| 9,268,275 | B2 | 2/2016 | Iwase | |
| 2014/0126945 | A1* | 5/2014 | Uchida | G03G 21/1633 399/406 |

FOREIGN PATENT DOCUMENTS

| | | | |
|---|---|---|---|
| JP | 2008122449 | A | 5/2008 |
| JP | 6381204 | B2 | 8/2018 |

OTHER PUBLICATIONS

Notice of Allowance issued in U.S. Appl. No. 17/462,383 mailed on Feb. 28, 2023.

* cited by examiner

FIXING APPARATUS AND IMAGE FORMING APPARATUS

BACKGROUND OF THE INVENTION

Field of the Invention

The present invention relates to a fixing apparatus which performs fixing processing on a recording medium which bears an unfixed image.

Description of the Related Art

As a fixing apparatus in an electrophotographic image forming apparatus (hereinafter referred to as an image forming apparatus), there is known a structure in which an image is fixed on a recording medium by heating and pressing a recording medium bearing an unfixed image in a fixing processing portion. Conventionally, in the image forming apparatus having such a fixing apparatus, an opening/closing cover which can be opened and closed is provided in an apparatus main body such that cartridge replacement and jam processing of a recording medium can be performed, and a user can have access to an internal portion of the apparatus by opening the opening/closing cover. On the other hand, there is disclosed a structure in which a fixing shutter for covering a fixing member such as a fixing roller in response to an opening/closing operation of a cover is provided such that a user is not injured by touching a heat source such as a fixing portion when an opening/closing cover is opened (Japanese Patent Application Publication No. 2003-140480).

SUMMARY OF THE INVENTION

As described in the conventional example described above, in a case where the fixing shutter is provided in the apparatus, a link member linked to the opening/closing cover is required in addition to the fixing shutter, and the size of the apparatus is increased due to an increase in the number of components and securement of component placement space. When a conveying path of each of entrance and exit portions of the fixing apparatus is made extremely narrow such that a finger of a user does not enter the fixing apparatus without providing the fixing shutter or the like, in the case of a recording medium, especially a recording medium having a large basic weight (cardboard), conveying resistance by the conveying path is increased, and a jam easily occurs. In addition, when a jammed recording medium is processed, it is feared that pull-out resistance of the recording medium will be increased, and part of the recording medium will be torn off and left in the apparatus.

The present invention has been made in view of the above problem, and an object of the invention of the present application is to provide a fixing apparatus capable of preventing a finger of a user from entering an internal portion of a fixing apparatus while reducing conveying resistance by a conveying path and pull-out resistance of a recording medium during jam processing.

In order to attain the above object, a fixing apparatus of the present invention includes:

a first rotating member which heats a recording medium;

a second rotating member which forms a nip portion with the first rotating member;

a holding member which is disposed downstream of the nip portion in a conveying direction of the recording medium and holds a conveying member which conveys the recording medium; and a guide member which is disposed at a position which is located downstream of the nip portion in the conveying direction and faces the conveying member, and guides conveyance of the recording medium;

wherein the fixing apparatus is not exposed to an outside of an image forming apparatus in a case where an opening/closing member, which can be opened and closed, is provided in the image forming apparatus in which the fixing apparatus is provided, and is provided downstream of the guide member in the conveying direction, is in a closed state, and the fixing apparatus is exposed to the outside in a case where the opening/closing member is in an opened state, wherein the holding member is at a first position in the case where the opening/closing member is in the closed state and a distance between the holding member at the first position and the guide member is a first distance, and the holding member can be displaced from the first position to a second position in the case where the opening/closing member is in the opened state and a distance between the holding member at the second position and the guide member is a second distance, and wherein the second distance is shorter than the first distance.

In addition, in order to attain the above object, an image forming apparatus of the present invention includes:

image forming unit for forming an unfixed image on a recording medium;

a fixing apparatus which fixes the unfixed image on the recording medium, and includes a first rotating member which heats the recording medium, a second rotating member which forms a nip portion with the first rotating member, a holding member which is disposed downstream of the nip portion in a conveying direction of the recording medium and holds a conveying member which conveys the recording medium, and a guide member which is disposed at a position which is located downstream of the nip portion in the conveying direction and faces the conveying member, and guides conveyance of the recording medium; and an opening/closing member which can be opened and closed and is provided downstream of the guide member in the conveying direction, wherein the fixing apparatus is not exposed to an outside of the image forming apparatus in a case where the opening/closing member is in a closed state, and the fixing apparatus is exposed to the outside in a case where the opening/closing member is in an opened state, wherein the holding member is at a first position in the case where the opening/closing member is in the closed state and a distance between the holding member at the first position and the guide member is a first distance, and the holding member can be displaced from the first position to a second position in the case where the opening/closing member is in the opened state and a distance between the holding member at the second position and the guide member is a second distance, and wherein the second distance is shorter than the first distance.

In order to attain the above object, a fixing apparatus of the present invention includes:

a first rotating member which heats a recording medium;

a second rotating member which forms a nip portion with the first rotating member;

a holding member which is disposed downstream of the nip portion in a conveying direction of the recording medium and holds a conveying member which conveys the recording medium;

a guide member which is disposed at a position which is located downstream of the nip portion in the conveying direction and faces the conveying member, and guides conveyance of the recording medium; and a frame which supports the first rotating member, the second rotating member, the guide member, and the holding member, wherein the holding member is provided in the frame so as to be rotatable about a rotation axis parallel to a width direction of the recording medium orthogonal to the conveying direction, wherein the frame includes a first restriction portion which restricts movement of the holding member in a direction away from the guide member at a first position, and a first urging member which applies a force for moving the holding member from a second position to the first position to the holding member, and wherein the guide member includes a second restriction portion which restricts movement of the approaching holding member at the second position having a distance between the holding member and the guide member shorter than the distance between the holding member and the guide member of the first position.

In addition, in order to attain the above object, an image forming apparatus of the present invention includes:

image forming unit for forming an unfixed image on a recording medium;

a first rotating member which heats the recording medium;

a second rotating member which forms a nip portion with the first rotating member;

a holding member which is disposed downstream of the nip portion in a conveying direction of the recording medium and holds a conveying member which conveys the recording medium;

a guide member which is disposed at a position which is located downstream of the nip portion in the conveying direction and faces the conveying member, and guides conveyance of the recording medium; and a frame which supports the first rotating member, the second rotating member, the guide member, and the holding member, wherein the holding member is provided in the frame so as to be rotatable about a rotation axis parallel to a width direction of the recording medium orthogonal to the conveying direction, wherein the frame includes a first restriction portion which restricts movement of the holding member in a direction away from the guide member at a first position, and a first urging member which applies a force for moving the holding member from a second position to the first position to the holding member, and wherein the guide member includes a second restriction portion which restricts movement of the approaching holding member at the second position having a distance between the holding member and the guide member shorter than the distance between the holding member and the guide member of the first position.

According to the fixing apparatus of the present invention, it is possible to provide the fixing apparatus capable of reducing the conveying resistance of a sheet and the pull-out resistance when jammed paper is pulled out to the outside of the apparatus while preventing the finger of the user from entering the internal portion of the fixing apparatus.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments. Each of the embodiments of the present invention described below can be implemented solely or as a combination of a plurality of the embodiments or features thereof where necessary or where the combination of elements or features from individual embodiments in a single embodiment is beneficial.

Embodiment 1

(1) Summary of Image Forming Process

Figure 1:
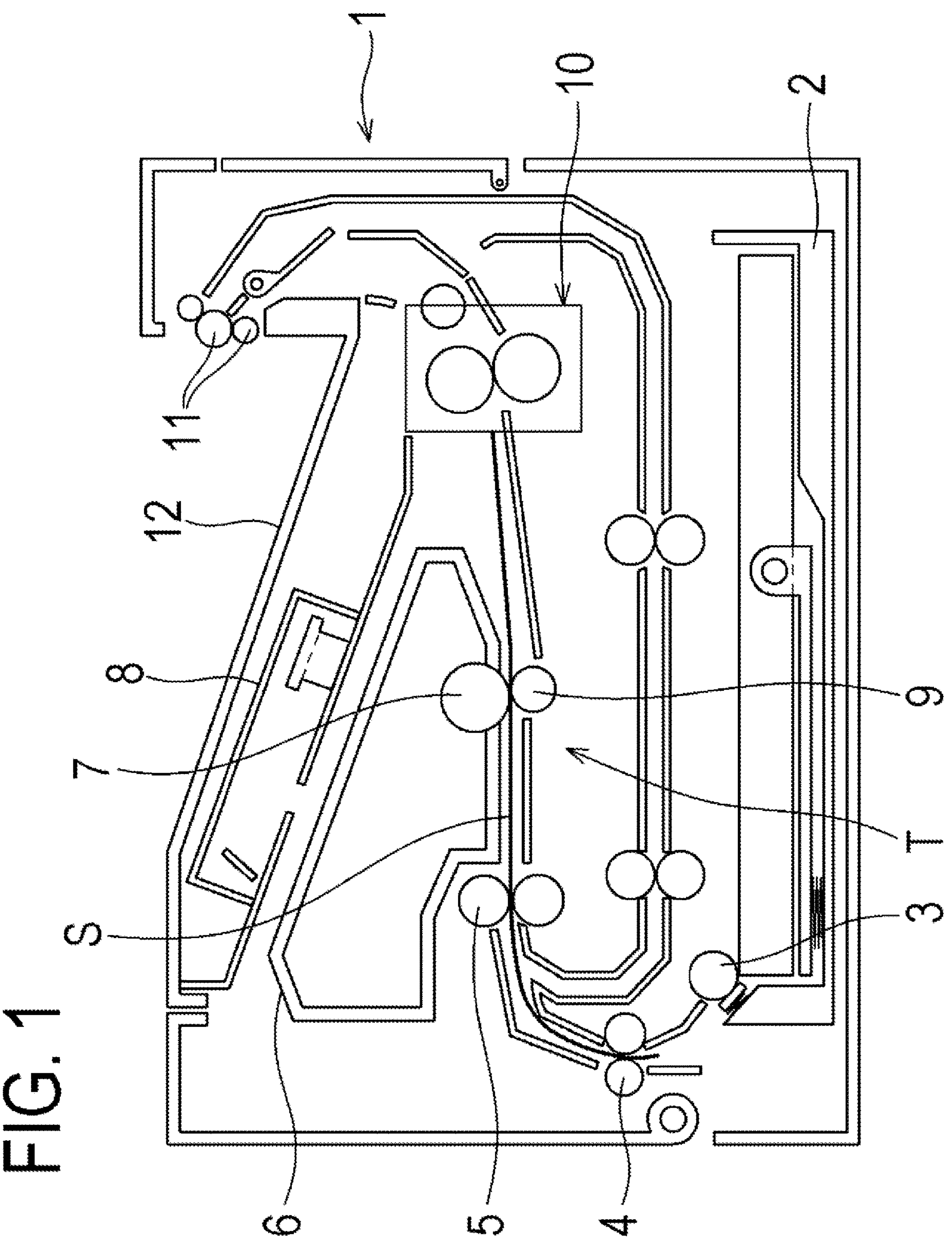
FIG. 1 is a cross-sectional view of an image forming apparatus according to Embodiment 1.

First, by using FIG. 1, a description will be given of a summary in which paper is fed, an image is formed, and the paper is discharged in an electrophotographic image forming apparatus to which an embodiment of the present invention is applied. FIG. 1 is a schematic cross-sectional view showing an image forming apparatus according to Embodiment 1 of the present invention.

Sheets S each serving as a recording medium which are stacked in a paper feed cassette 2 detachably attached to an image forming apparatus main body 1 (hereinafter referred to as an apparatus main body 1) are conveyed one by one separately by a paper feed roller 3, and are conveyed to a transfer portion T by conveying roller pairs 4 and 5. On the other hand, a latent image is formed by a laser emitted from a laser scanner 8 on a surface of a drum 7 serving as an image bearing member which is provided in a process cartridge 6 (hereinafter referred to as a cartridge 6) detachably attached to the apparatus main body 1. Next, the latent image is developed by developing unit (not shown) provided in the cartridge 6, and a toner image is formed. The toner image is transferred to the sheet S by the drum 7 and a transfer roller 9 in the transfer portion T, and the sheet S is conveyed to a fixing apparatus (fixing unit) 10 while bearing an unfixed image. The toner image is fixed by heating and pressing on the sheet S conveyed to the fixing apparatus 10, and the sheet S is then discharged to a discharge portion 12 by a discharge roller pair 11.

(2) Description of Structure of Fixing Apparatus

Figure 2:
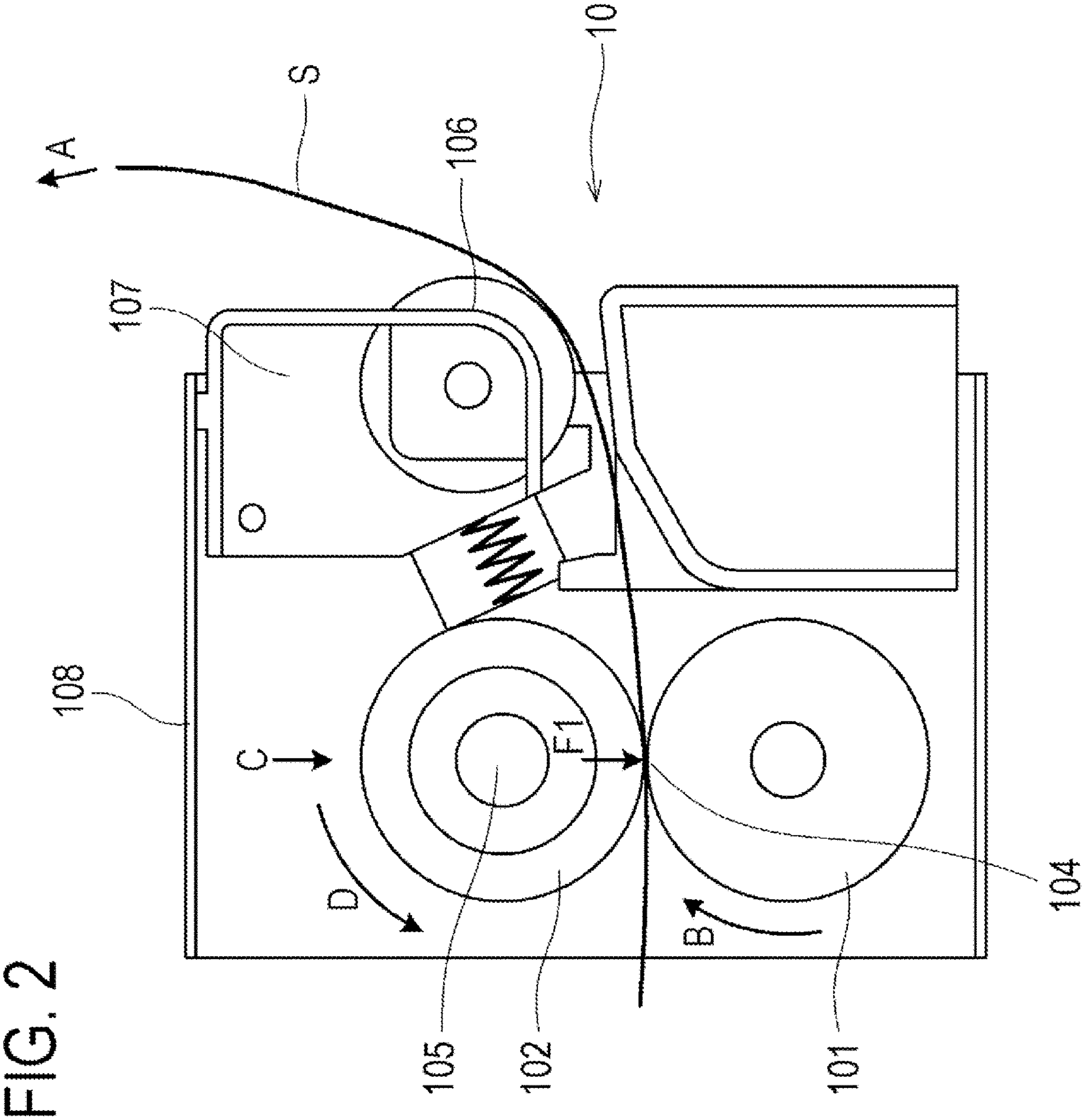
FIG. 2 is a cross-sectional view of a fixing apparatus according to Embodiment 1.
Figure 3A:
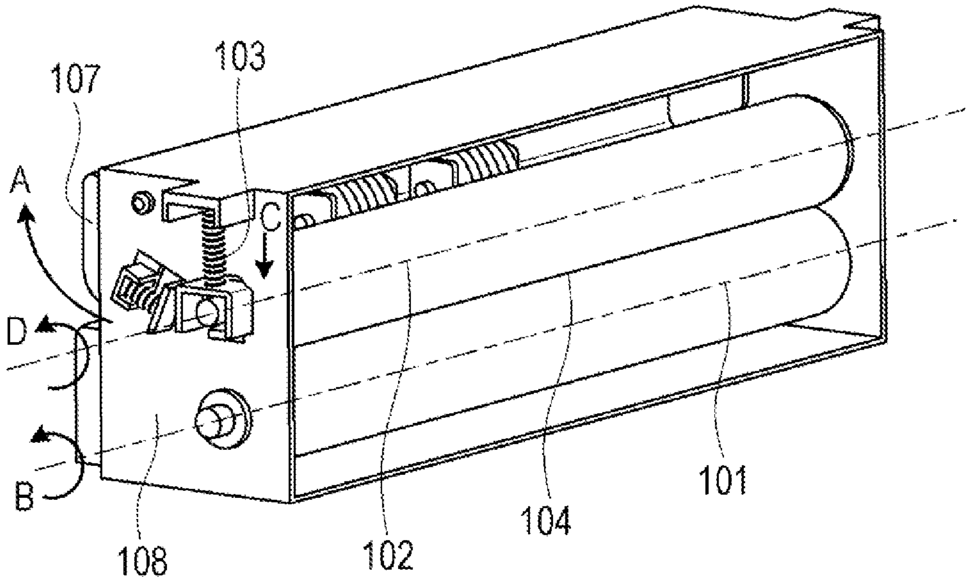
FIGS. 3A and 3B are perspective views of the fixing apparatus according to Embodiment 1.
Figure 3B:
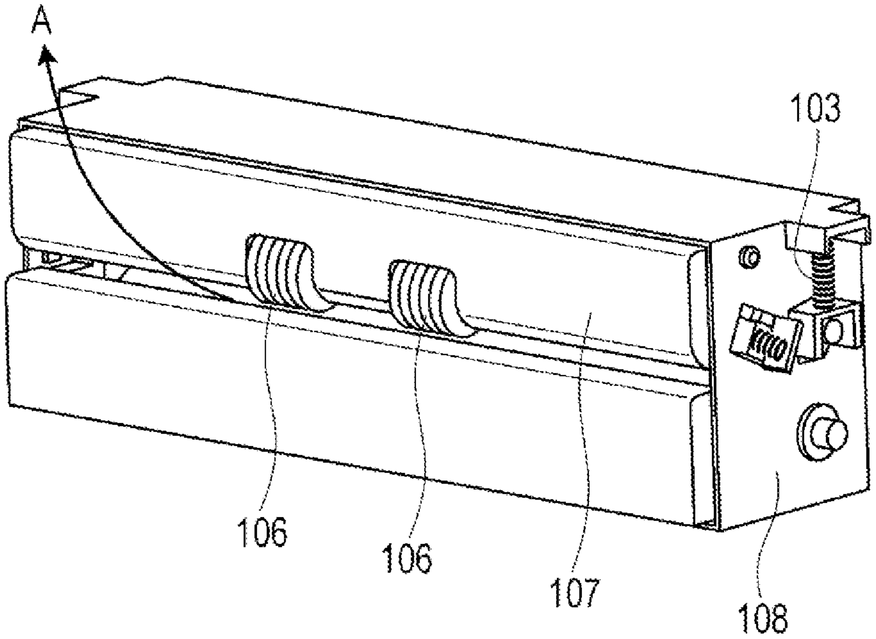

Next, by using FIG. 2 to FIGS. 5A to 5D, the structure of the fixing apparatus 10 will be described. FIG. 2 is a cross-sectional view of the fixing apparatus 10, and an arrow A indicates a conveying direction of the sheet S. FIGS. 3A and 3B are perspective views of the fixing apparatus 10 according to Embodiment 1, and FIG. 3A is a perspective view when the fixing apparatus 10 is viewed from an upstream side in the conveying direction (a side on which a pressure roller 101 and a heat roller 102 are disposed). FIG. 3B is a perspective view when the fixing apparatus 10 is viewed from a downstream side in the conveying direction (a side on which a roller 106 and a roller holder 107 are disposed). The pressure roller 101 (second rotating member) serving as a pressing member and the heat roller 102 (first rotating member) serving as a heating member are rotatably supported by a frame 108, and the pressure roller 101 is driven in a direction of an arrow B by drive unit which is not shown. In addition, the heat roller 102 is urged in a direction of an arrow C by a fixing spring 103 (see FIG. 3A), and the heat roller 102 forms a fixing nip 104 serving as a nip portion together with the pressure roller 101 with a nip pressure F1. The heat roller 102 is driven by rotation of the pressure roller 101, and rotates in a direction of an arrow D. Further, a heater 105 is mounted inside the heat roller 102, and can heat the heat roller 102.

Next, a description will be given of a support structure of the roller 106 serving as a conveying member for conveying the sheet S, and the roller holder 107 serving as a holding member for holding the roller 106. The rollers 106 are disposed rotatably in the roller holder 107 downstream of the fixing nip 104 in the conveying direction.

Figure 4A:
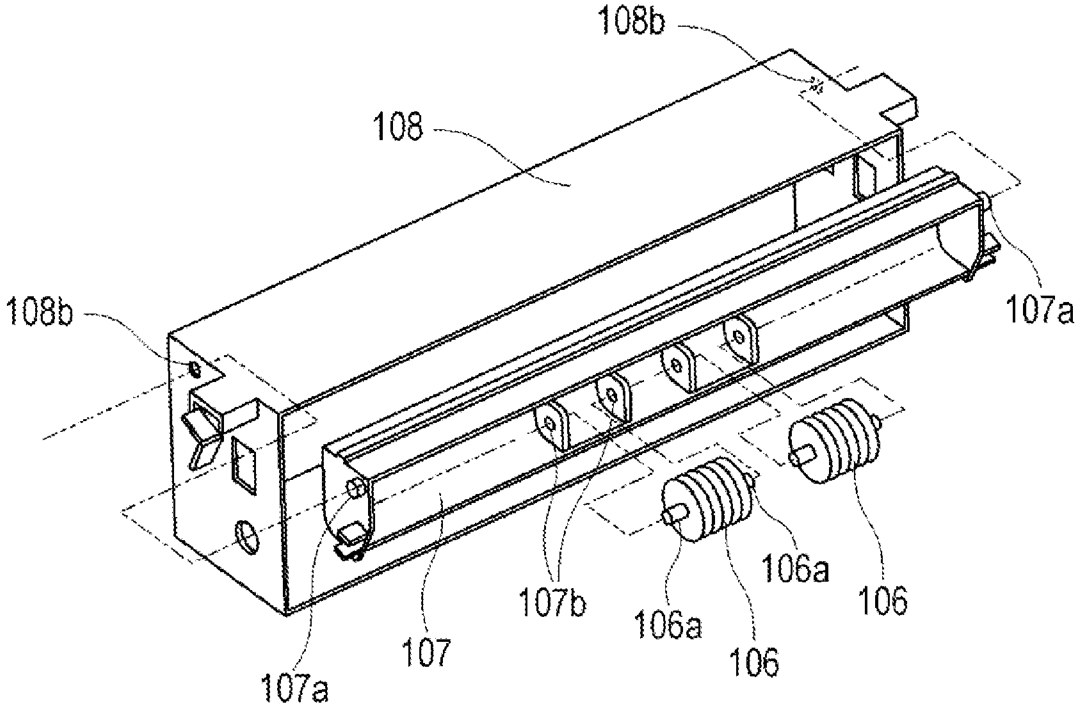
FIGS. 4A and 4B are perspective views of fixing apparatus components according to Embodiment 1.
Figure 4B:
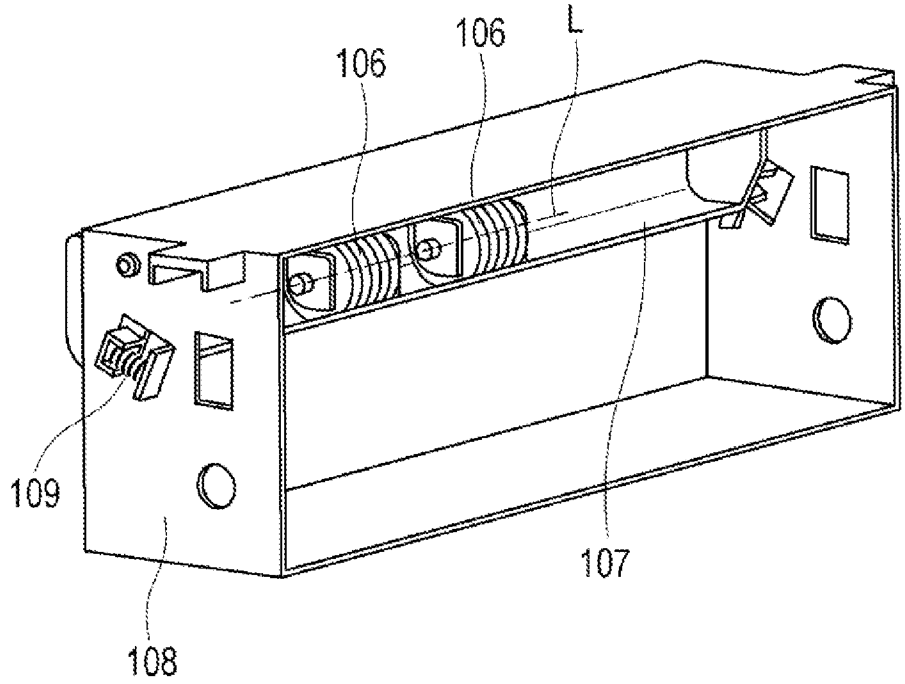

FIGS. 4A and 4B are perspective views showing the support structure of the roller holder 107 and the roller 106, FIG. 4A is an exploded perspective view which disassembles and shows the rollers 106, the roller holder 107, and the frame 108, and FIG. 4B is a perspective view showing a state in which the rollers 106, the roller holder 107, the frame 108, and an urging member 109 are mounted. Note that, in FIGS. 4A and 4B, in order to simply show the support structure of the roller holder 107, the pressure roller 101, the heat roller 102, and a facing guide 110 are not shown. As shown in FIG. 4A, a shaft portion 106*a* of each roller 106 is rotatably supported (held) by bearing portions 107*b* of the roller holder 107. With this, the roller 106 can rotate about an axial line L with respect to the roller holder 107, and the roller 106 is a driven roller which rotates in response to movement of the sheet S by coming in contact with the conveyed sheet S. The roller 106 comes in contact with an image surface side of the sheet S in the case of an apparatus structure for one-side printing. In addition, the roller holder 107 is swingably supported by the frame 108. The roller holder 107 is structured to be movable in the fixing apparatus 10 such that the position of the roller holder 107 with respect to the pressure roller 101 and the heat roller 102 serving as fixing unit is displaced in a predetermined range in the conveying direction of the sheet S by swing relative to the frame 108. A shaft portion 107*a* of the roller holder 107 is supported by bearing portions 108*b* of the frame 108. With this structure, the roller holder 107 can rotate about a rotation axis parallel to a width direction of the sheet S orthogonal to the conveying direction. Further, as shown in FIG. 4B, a force is applied to the roller holder 107 from below by the urging member (spring) 109 serving as a first urging member, and the roller holder 107 is caused to abut the frame 108 (the detail thereof will be described later).

(3) Description of Roller Holder

Figure 5A:
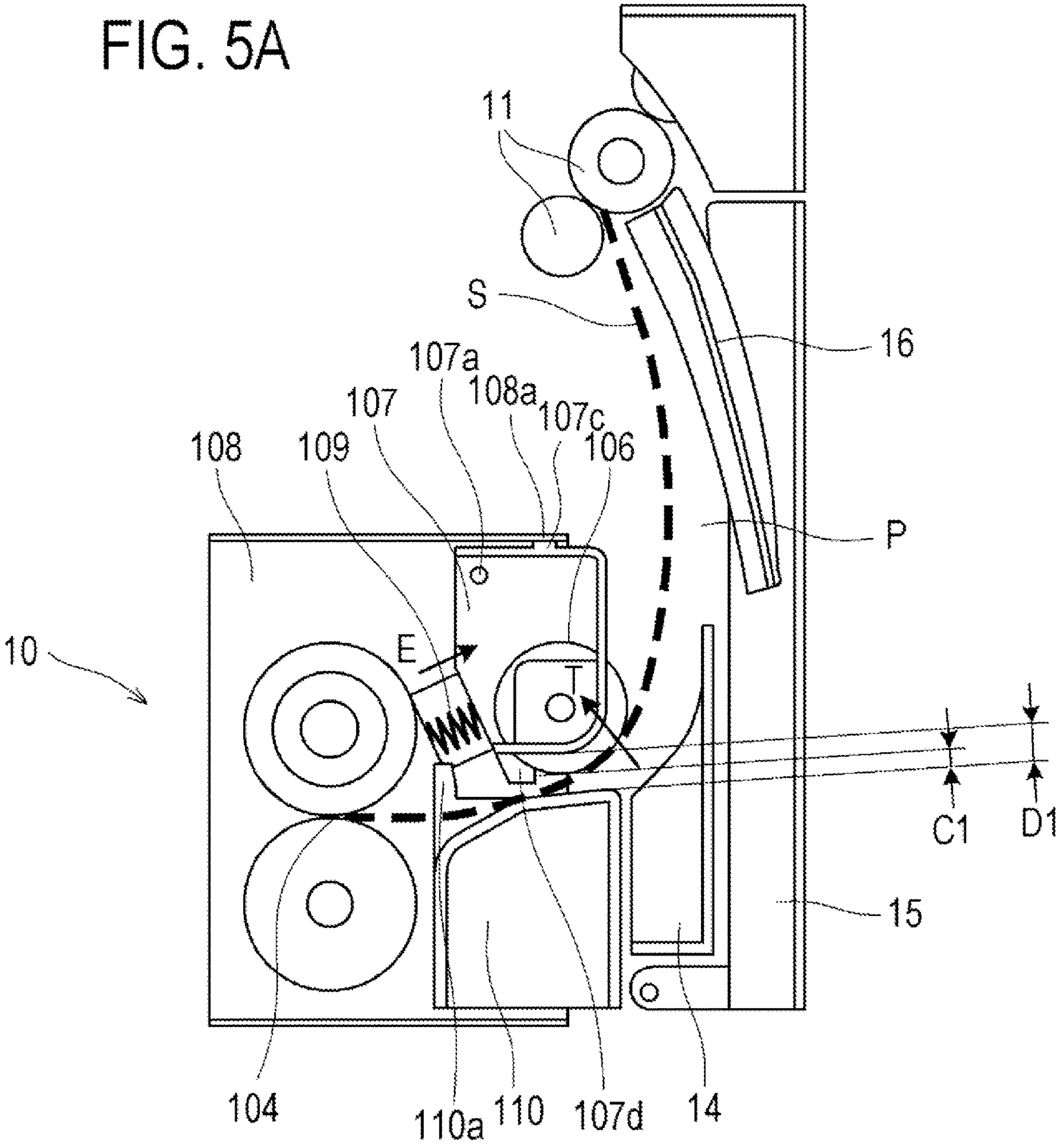
FIG. 5A is a cross-sectional view of the fixing apparatus according to Embodiment 1.
Figure 5B:
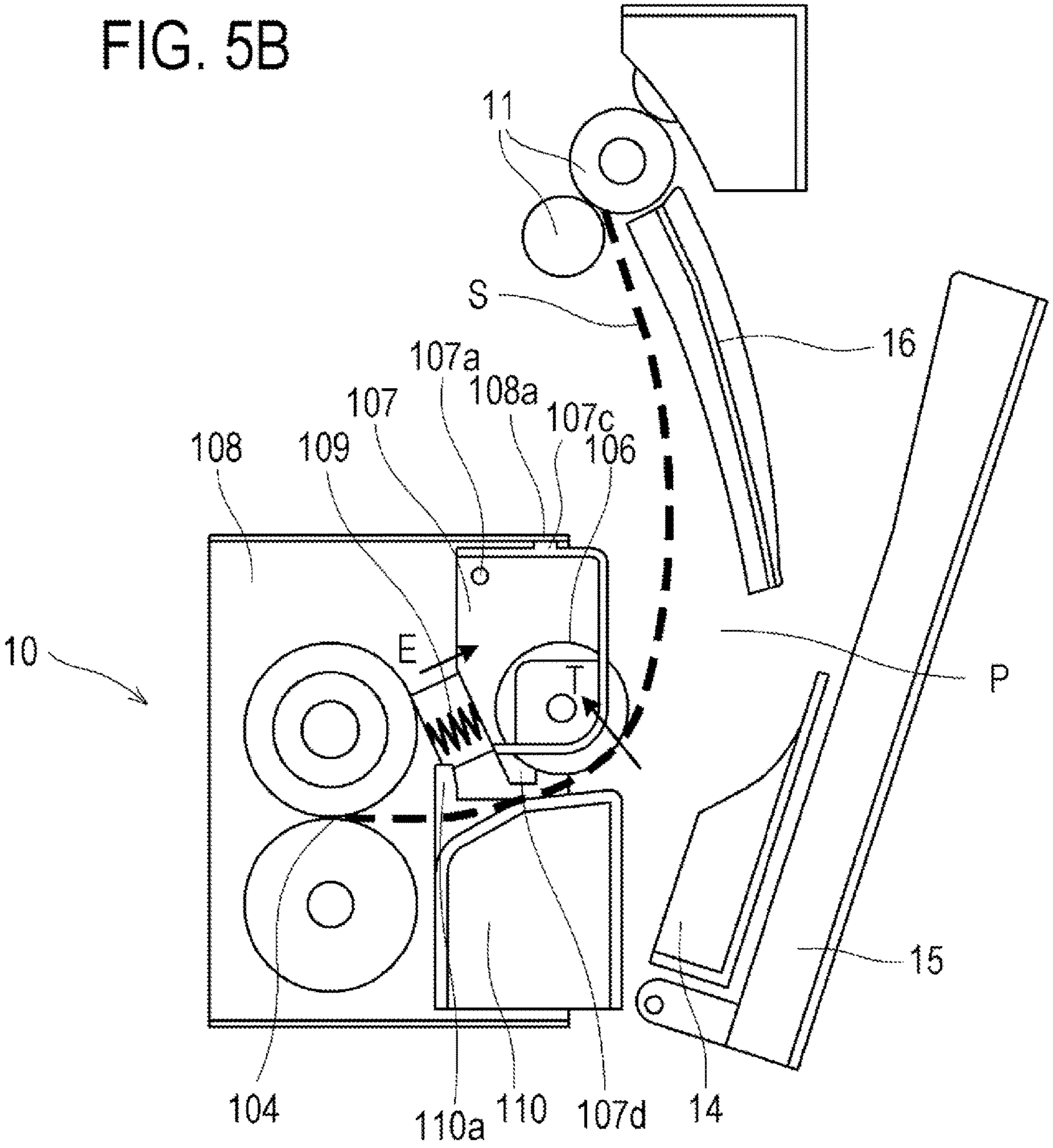
FIG. 5B is a cross-sectional view of the fixing apparatus according to Embodiment 1.
Figure 5C:
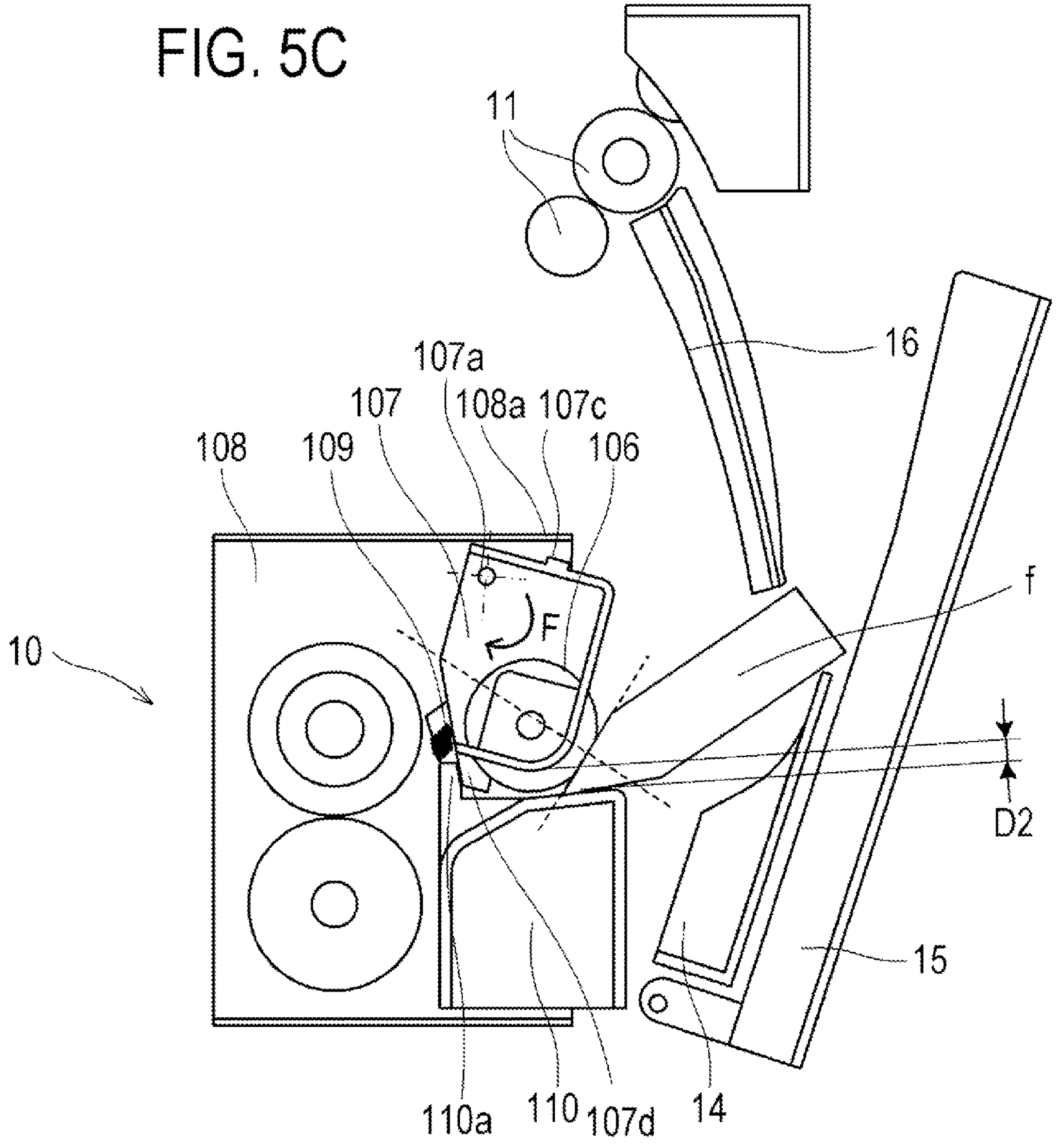
FIG. 5C is a cross-sectional view of the fixing apparatus according to Embodiment 1.
Figure 5D:
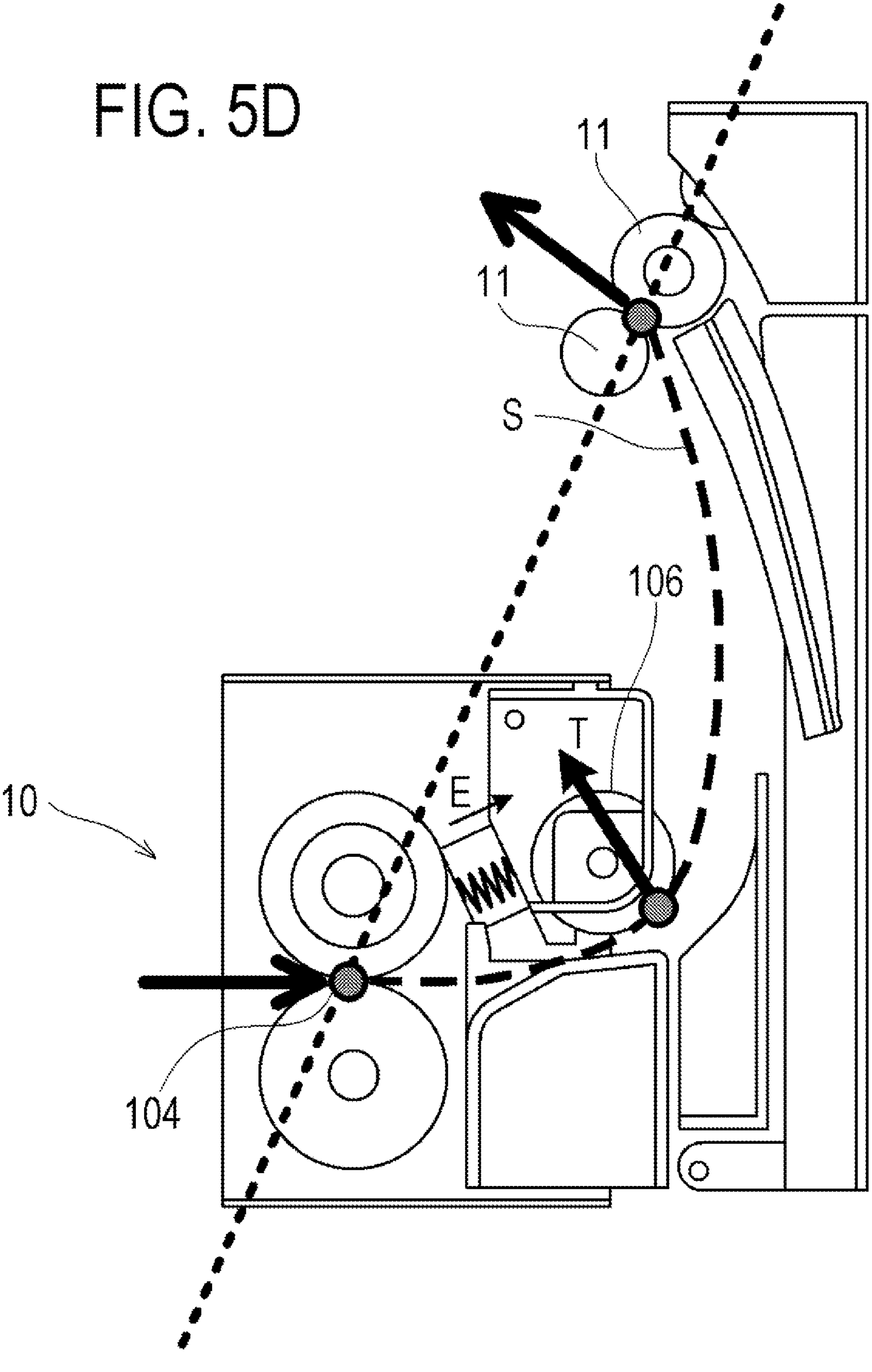
FIG. 5D is a cross-sectional view of the fixing apparatus according to Embodiment 1.

Next, by using FIGS. 5A to 5D, the structure and operation of the roller holder will be described in detail. The roller holder 107 is urged in a direction of an arrow E with respect to the frame 108 by the urging member 109. The roller holder 107 has an abutting portion 107*c*. The abutting portion 107*c* abuts the downstream side in the conveying direction of an abutted portion 108*a* of the frame 108, and the position of the roller holder 107 is thereby determined. In this state, a conveying path P through which the sheet S passes is formed by the roller 106, the facing guide 110, a conveying guide 14, an opening/closing guide 15, and a swing guide 16 from the downstream side of the fixing nip 104 to the discharge roller pair 11 (FIG. 5A). That is, the position of the roller holder 107 at this point is a first position at which the roller holder 107 should be positioned while the fixing apparatus 10 executes a fixing operation, and is a position which maximizes a distance to the fixing unit. In the curved conveying path P formed between the fixing nip 104 and the discharge roller pair 11 serving as a downstream conveying member positioned downstream of the roller 106 in the conveying direction, the roller 106 is disposed on an inner side of a part of the conveying path P having a sharp curve (FIG. 5D). As a guide member for guiding the conveyance of the sheet S of the present invention, the facing guide 110 is fixed to the frame 108 at a position facing the roller 106. Let C1 denotes a clearance between the roller 106 and the facing guide 110 when the roller holder 107 is at the first position. Herein, the size of the clearance C1 serving as a first clearance is set to a size which allows conveyance of the sheet S having a large basic weight (cardboard). In addition, a clearance D1 which is larger than the clearance C1 is formed between the roller holder 107 and the facing guide 110 such that the sheet S does not slide on the roller holder 107 during the conveyance of the sheet S.

Herein, as shown in FIG. 5D, in a state in which the sheet S is held by the fixing nip 104 and the discharge roller pair 11 simultaneously during the conveyance of the sheet S, tension of the sheet S bent along the curved conveying path acts on the roller holder 107 via the roller 106 in a direction of an arrow T. The shaft portion 107*a* serving as the swing center of the roller holder 107 is preferably disposed at a position which does not cause the shaft portion 107*a* to swing in a direction opposite to the arrow E (an F direction in FIG. 5C) by the tension of the sheet S. Alternatively, an urging force of the urging member 109 may be set to be sufficiently large such that the roller holder 107 is not moved by the tension of the sheet S. With this structure, the roller holder 107 is structured to be held at the first position irrespective of whether or not the sheet S is conveyed at least when the opening/closing guide 15 is in a closed state.

An outer side of the conveying path P is formed with the opening/closing guide 15 which allows access to the fixing apparatus 10 by opening an internal portion together with the conveying guide 14 positioned downstream of the facing guide 110 in the conveying direction. The opening/closing guide 15 supports the conveying guide 14, and is structured to be able to be opened and closed integrally with the conveying guide 14, and forms the openable conveying path. With an operation for opening the opening/closing guide 15 by a user, the conveying path P is partially opened (FIG. 5B). In a case where the sheet S is jammed in the conveying path P, by opening the opening/closing guide 15 by the user, the conveying path P and the fixing apparatus 10 are partially opened and exposed to the outside, and access and processing to and of jammed paper from the outside of the apparatus are allowed.

In a jam processing operation and an operation of inserting a finger into the apparatus by the user, there are cases where a finger f of the user presses the roller holder 107 in the vicinity of the roller 106. At this point, the roller holder 107 is caused to swing about the shaft portion 107*a* to the upstream side in the conveying direction (the direction of the arrow F) against the urging force of the urging member 109 (FIG. 5C). The shaft portion 107*a* serving as the swing center of the roller holder 107 is disposed at a position which causes the roller holder 107 to swing in the direction of the arrow F with the finger f of the user. In addition, a facing guide abutting portion 107*d* is caused to abut an abutted portion 110*a* of the facing guide 110 such that the position of the roller holder 107 is determined when the roller holder 107 swings by a specific amount, and swing in the direction of the arrow F is thereby restricted. Thus, when D2 denotes a clearance between the roller holder 107 at the position when the facing guide abutting portion 107*d* is caused to abut the abutted portion 110*a* and the facing guide 110, $$D2<D1$$

is satisfied, and D2 serving as a second distance is shorter than D1 serving as a first distance.

In the frame 108, the abutting portion 107*c* of the roller holder 107 serving as a first abutting portion abuts the abutted portion 108*a* (first restriction portion) serving as a first abutted portion. In addition, in the facing guide 110, the facing guide abutting portion 107*d* serving as a second abutting portion abuts the abutted portion 110*a* (second restriction portion) serving as a second abutted portion. Accordingly, a movable range in an advance/retreat direction (sheet conveying direction) relative to the fixing unit is restricted in a predetermined range. That is, the roller holder 107 is displaced from the first position which maximizes the distance to the fixing unit and forms D1 serving as a first clearance to a second position which minimizes the distance to the fixing unit and forms D2 serving as a second clearance. With this structure, it becomes possible to prevent careless access of the user to the fixing unit. Further, D2 is structured to have a specific clearance amount or less which does not allow the entry of the finger of the user. Note that a structure may also be adopted in which D2 is set to a value as close to 0 as possible, a concave shape is provided in part of the facing guide 110, and the roller 106 enters the concave shape.

With the structure described above, by a feature in which the roller holder 107 is at the first position during the conveyance of the sheet S and the wide clearance of the conveying path is thereby secured, it is possible to reduce conveying resistance of the sheet S and secure excellent conveyability. In addition, at the time of occurrence of the jam of the sheet S, the wide clearance of the conveying path is secured, and hence it is possible to reduce pull-out resistance when the jammed paper is pulled out to the outside of the apparatus. Further, when the user tries to push a finger into the clearance of the conveying path positioned downstream of the fixing nip, the roller holder 107 swings in a direction toward the second position, and the clearance of the conveying path is thereby reduced, and it is possible to prevent the finger of the user from entering the internal portion of the fixing apparatus.

Embodiment 2

Figure 6A:
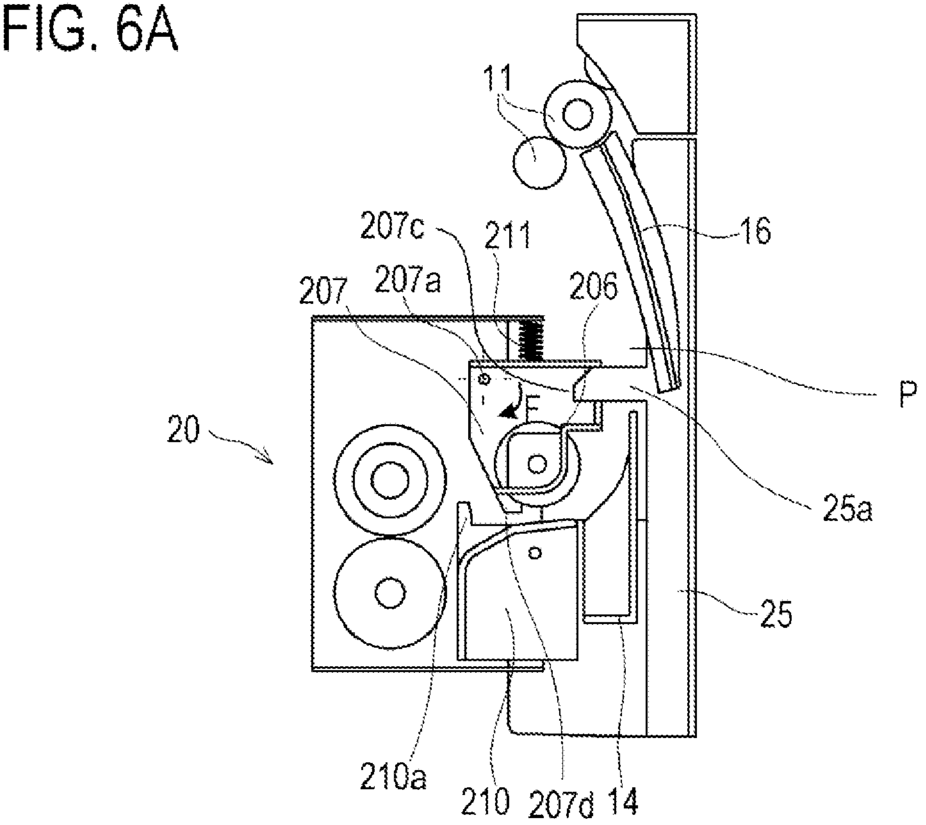
FIGS. 6A and 6B are cross-sectional views of a fixing apparatus according to Embodiment 2.
Figure 6B:
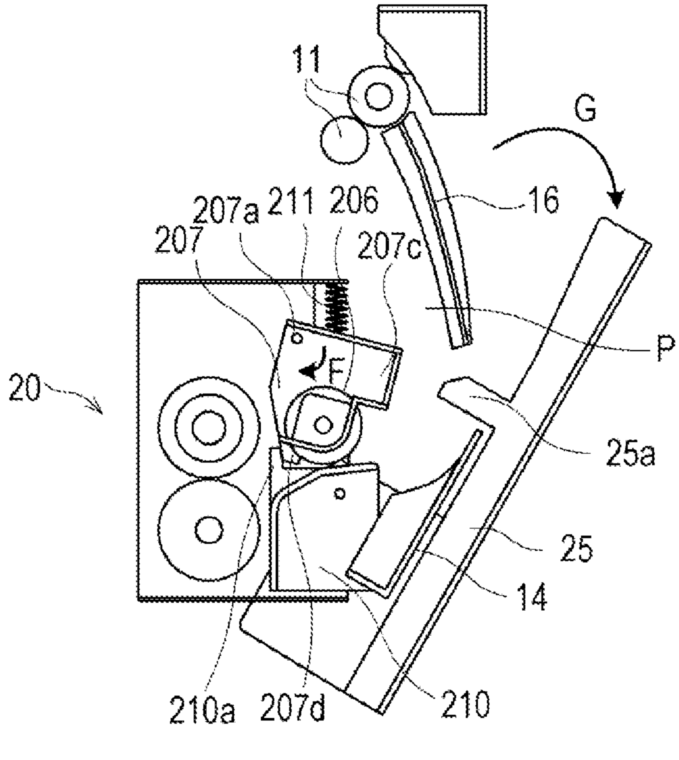

Next, Embodiment 2 will be described with reference to FIGS. 6A and 6B. FIGS. 6A and 6B are cross-sectional views of a fixing apparatus 20 in Embodiment 2. Note that elements having structures and operations substantially identical or equivalent to those in Embodiment 1 are designated by the same reference numerals, and the description in Embodiment 1 is cited as the detailed description thereof.

As shown in FIGS. 6A and 6B, an opening/closing guide 25 has a protrusion portion 25*a* serving as an attitude restriction portion for restricting the attitude of a roller holder 207. In addition, the roller holder 207 has a hole portion 207*c*. The roller holder 207 is urged to the upstream side in the conveying direction (a direction of an arrow F) about a shaft portion 207*a* by its own weight or an urging force of a urging member 211 serving as a third urging member.

In a closed state in which the opening/closing guide 25 is closed, in an area which is not in the conveying direction of the sheet S (the width direction of the sheet S orthogonal to the conveying direction of the sheet S), the protrusion portion 25*a* enters the hole portion 207*c*. Thus, the hole portion 207*c* abuts the protrusion portion 25*a*, and the position of the roller holder 207 is thereby determined (first position). In this state, the conveying path P through which the sheet S passes is formed (FIG. 6A). Subsequently, when the state of the opening/closing guide 25 is changed to an opened state in which the opening/closing guide 25 is opened in a direction of an arrow G, the restriction of the roller holder 207 by the protrusion portion 25*a* is stopped. With this, the roller holder 207 is caused to swing to the upstream side in the conveying direction (the direction of the arrow F) about the shaft portion 207*a* by its own weight or the urging force of the urging member 211 (FIG. 6B) (second position). A facing guide abutting portion 207*d* is caused to abut an abutted portion 210*a* of a facing guide 210 such that the position of the roller holder 207 is determined when the roller holder 207 swings by a specific amount.

With the structure described above, by a feature in which the roller holder 207 is at the first position in the state in which the opening/closing guide 25 is closed and the wide clearance of the conveying path is thereby secured, it is possible to reduce the conveying resistance of the sheet S and secure excellent conveyability. Further, the opening/closing guide 25 is opened during the jam processing of the user, whereby the roller holder 207 swings to the second position, the clearance of the conveying path is reduced, and it is possible to prevent the finger of the user from entering the internal portion of the fixing apparatus.

Embodiment 3

Figure 7A:
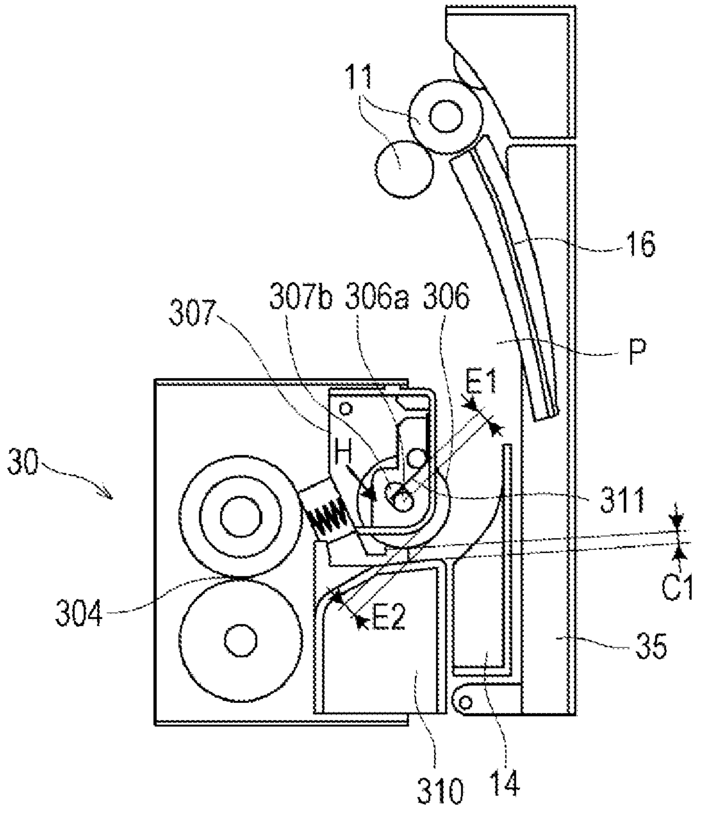
FIGS. 7A and 7B are cross-sectional views of a fixing apparatus according to Embodiment 3.
Figure 7B:
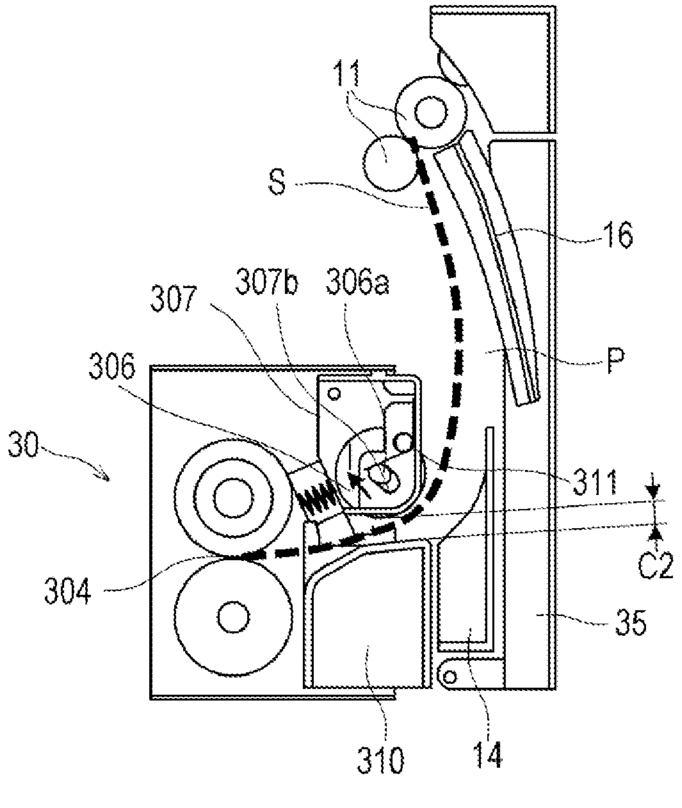

Next, Embodiment 3 will be described with reference to FIGS. 7A and 7B. FIGS. 7A and 7B are cross-sectional views of a fixing apparatus 30 in Embodiment 3. Note that elements having structures and operations substantially identical or equivalent to those in Embodiment 1 are designated by the same reference numerals, and the description in Embodiment 1 is cited as the detailed description thereof.

As shown in FIGS. 7A and 7B, a roller 306 in the present embodiment is movably mounted to a roller holder 307 such that a clearance between the roller 306 and a facing guide 310 serving as a conveying guide can be changed. That is, a shaft portion 306*a* of the roller 306 is rotatably supported by bearing portions 307*b* of the roller holder 307. Each bearing portion 307*b* has a shape of an elongated hole, and the roller 306 can swing in a longitudinal direction of the elongated hole. When E1 denotes the dimension of the elongated hole in the longitudinal direction (a maximum swing amount of the roller 306 in a direction of an arrow I), and E2 denotes a protrusion amount of the roller 306 from the roller holder 307 in FIG. 7A, $$E1<E2$$

is satisfied.

With this, also in a case where the roller 306 is caused to swing in the elongated hole, the outside shape of the roller 306 protrudes from the roller holder 307. The roller 306 is urged by an urging member (helical torsion coil spring) 311 serving as a second urging member in a direction of an arrow H, i.e., in a direction in which a clearance between the roller 306 and the facing guide 310 is reduced.

In a state in which the sheet S is not present in the conveying path P, the shaft portion 306*a* of the roller 306 is caused to abut the side of the conveying path P of the shape of the elongated shape of the bearing portion 307*b* (first position). At this point, a clearance C1 is formed between the roller 306 and the facing guide 310 (FIG. 7A).

During the conveyance of the sheet S, in a state in which the sheet S is held by a fixing nip 304 and the discharge roller pair 11, the roller 306 is caused to swing by the tension of the sheet S in a direction opposite to the conveying path P (a direction of an arrow I) against an urging force of the urging member 311. With this, a clearance C2 between the roller 306 and the facing guide 310 is increased to be larger than C1 (FIG. 7B).

With the structure described above, the roller 306 moves in the I direction in a state in which the roller holder 307 is at the first position, whereby it is possible to further increase the clearance of the conveying path described in Embodiment 1 described above during the conveyance of the sheet S. With this, as compared with Embodiment 1, it is possible to further reduce the conveying resistance of the sheet S, and secure excellent conveyability. In addition, it is possible to further reduce the pull-out resistance when the jammed paper is pulled out to the outside of the apparatus. Further, similarly to Embodiment 1, when the user tries to push the finger into the clearance of the conveying path positioned downstream of the fixing nip, the roller holder 307 swings to be brought into the state of the second position in which the roller holder 307 is closer to the facing guide 310, whereby the clearance of the conveying path is reduced, and it is possible to prevent the finger of the user from entering the internal portion of the fixing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-147503, filed on Sep. 2, 2020, No. 2021-130931, filed on Aug. 10, 2021, which are hereby incorporated by reference herein in their entirety.

What is claimed is:

1. An image forming apparatus comprising:

an image forming unit which forms a toner image on a recording medium;

a fixing unit which fixes the toner image to the recording medium in a nip portion;

a discharge roller pair which discharges the recording medium which has passed through the nip portion and had the toner image fixed thereon;

a driven roller which is disposed in a bent conveying path between the nip portion and the discharge roller pair and rotates in a response to movement of the recording medium by coming in contact with the conveyed recording medium from an inner circumferential side of the conveying path;

a holder which rotatably supports the driven roller, forms a part of the conveying path, and swings about a shaft provided above an axis of the driven roller;

a facing guide which is provided at a position facing the holder, forms a part of the conveying path together with the holder, and guides the recording medium toward the discharge roller pair; and an opening/closing member which can be opened and closed, forms a part of the conveying path and guides the recording medium toward the discharge roller pair in a closed state, and exposes the conveying path to the outside of the image forming apparatus in an open state;

wherein the holder is positioned at a first position in a case where the opening/closing member is in the closed state, and is displaced from the first position toward the facing guide by an external force in a case where the opening/closing member is in the open state, and wherein D1>D2 is satisfied, where D1 is a gap of the conveying path formed by the holder and the facing guide in a case where the opening/closing member is in the closed state, D2 is a gap of the conveying path formed by the holder and the facing guide in a case where the opening/closing member is in the open state and the holder is displaced to a second position by receiving the external force.

2. The image forming apparatus according to claim 1, wherein the holder is structured to be held at the first position irrespective of whether or not the recording medium is conveyed at least in a case where the opening/closing member is in the closed state.

3. The image forming apparatus according to claim 1, further comprising:

a first urging member which urges the holder such that the holder is positioned at the first position.

4. The image forming apparatus according to claim 3, wherein an urging force of the first urging member is larger than a force which the holder receives from the recording medium via a conveying member.

5. The image forming apparatus according to claim 1, wherein the first position is a position at which the holder is positioned in a case where heating of the recording medium by the fixing unit is performed.

6. The image forming apparatus according to claim 1, further comprising:

a frame which supports the fixing unit, the facing guide and the holder, wherein the holder has a first abutting portion and a second abutting portion, the frame has a first abutted portion which the first abutting portion abuts in a case where the holder is at the first position, and the facing guide has a second abutted portion which the second abutting portion abuts in a case where the holder is at the second position.

7. The image forming apparatus according to claim 1, wherein the driven roller is movably mounted to the holder such that a distance between the driven roller and the facing guide can be changed, wherein the holder includes a second urging member which urges the driven roller in a direction which reduces the distance with respect to the holder.

* * * * *